(12) United States Patent
Burrell et al.

(10) Patent No.: US 7,313,537 B1
(45) Date of Patent: Dec. 25, 2007

(54) INVENTORY RECORD RECONCILIATION

(75) Inventors: Jeffery O. Burrell, Decatur, GA (US); Donald L. Rhoads, Germantown, TN (US); Christopher H. Hymel, Birmingham, AL (US); Andy T. Ewing, Atlanta, GA (US); Susan H. Menkhaus, Alpharetta, GA (US); Carol A. Brechtel, Baton Rouge, LA (US); Linda C. Narcisse, Baton Rouge, LA (US)

(73) Assignee: AT&T Delaware Intellectual Property, Inc., Wilmington, DE (US)

( * ) Notice: Subject to any disclaimer, the term of this patent is extended or adjusted under 35 U.S.C. 154(b) by 912 days.

(21) Appl. No.: 09/964,973

(22) Filed: Sep. 27, 2001

(51) Int. Cl.
*G06Q 10/00* (2006.01)
(52) U.S. Cl. ....................................................... 705/28
(58) Field of Classification Search .................. 705/28, 705/29, 30, 35, 36
See application file for complete search history.

(56) References Cited

U.S. PATENT DOCUMENTS

| | | | | |
|---|---|---|---|---|
| 5,101,352 | A | * | 3/1992 | Rembert ........................ 705/8 |
| 5,319,544 | A | * | 6/1994 | Schmerer et al. ............. 705/28 |
| 5,400,253 | A | * | 3/1995 | O'Connor ................... 701/123 |
| 5,936,860 | A | * | 8/1999 | Arnold et al. ................ 700/95 |
| 5,978,771 | A | * | 11/1999 | Vandivier, III ................. 705/8 |
| 6,430,536 | B2 | * | 8/2002 | Irving et al. .................... 705/2 |
| 6,601,764 | B1 | * | 8/2003 | Goodwin, III .............. 235/385 |
| 2002/0069103 | A1 | * | 6/2002 | Puri et al. ...................... 705/11 |

OTHER PUBLICATIONS

U.S. Appl. No. 10/017,311 entitled: Central Inventory Record Reconciliation.
U.S. Official Action dated Aug. 5, 2005 in U.S. Appl. No. 10/017,311.
U.S. Official Action dated Dec. 28, 2005 cited in U.S. Appl. No. 10/017,311.
U.S. Official Action dated Jun. 19, 2006 cited in U.S. Appl. No. 10/017,311.

* cited by examiner

*Primary Examiner*—Gerald J. O'Connor
(74) *Attorney, Agent, or Firm*—Merchant & Gould

(57) ABSTRACT

A system for reconciling an inventory record having a count of products, pricing, and vintaging assigns a price and vintage for instances written-on to the count when products are found in inventory that are not accounted for by the inventory record. The price and vintage assigned to the instances added to the count are statistically determined from inventory records after outlier values have been removed. The instances with outlier values may also be removed from the inventory record being reconciled prior to comparing the inventory record to a recount of the items in inventory. The representative price and vintage may be stored in a table that is referenced when performing the reconciliation process. A substitution table may also be used to find interchangeable product types and reduce the number of instances to be written-on or written-off.

8 Claims, 6 Drawing Sheets

Product A                              204    Product B
202 →    count      price     vintage              count      price     vintage
    210   1    212 $100  214 1990                    1         $130      1993
    216 → 2         $100      1991                   2         $140      1994
          3         $125      1992                   3         $150      1994
          ⋮          ⋮         ⋮                     ⋮          ⋮         ⋮
          N         $190      2001                   K         $215      2001

Product Y   206                        Product Z   208
200       count      price     vintage              count      price     vintage
          1          $100      1989                  1         $75       1987
    218 → 2          $100,000  1990           222 → 2          $0.75     1988
    220 → 3          $120      1920           224 → 3          $100      2200
          ⋮           ⋮         ⋮                    ⋮          ⋮         ⋮
          X          $200      2001                  J         $110      2001

FIG. 2

| Product Type | Price | Vintage |
|---|---|---|
| 302 Product A | 304 $142 | 306 1995 |
| Product B | $171 | 1996 |
| ⋮ | ⋮ | ⋮ |
| Product Y | $148 | 1995 |
| Product Z | $93 | 1993 |

| Product Type | Substitutions |
|---|---|
| 402 Product A | 404 Product B, Product D |
| Product B | Product A, Product D |
| ⋮ | ⋮ |
| Product Y | Product O |
| Product Z | Product M |

| Product Type | Reductions | Additions |
|---|---|---|
| Product A (#142, 1995) | 2 | — |
| Product B (#171, 1996) | — | 3 |
| ⋮ | ⋮ | ⋮ |
| Product Y (#148, 1995) | — | — |
| Product Z (#93, 1993) | — | 1 |

FIG. 5

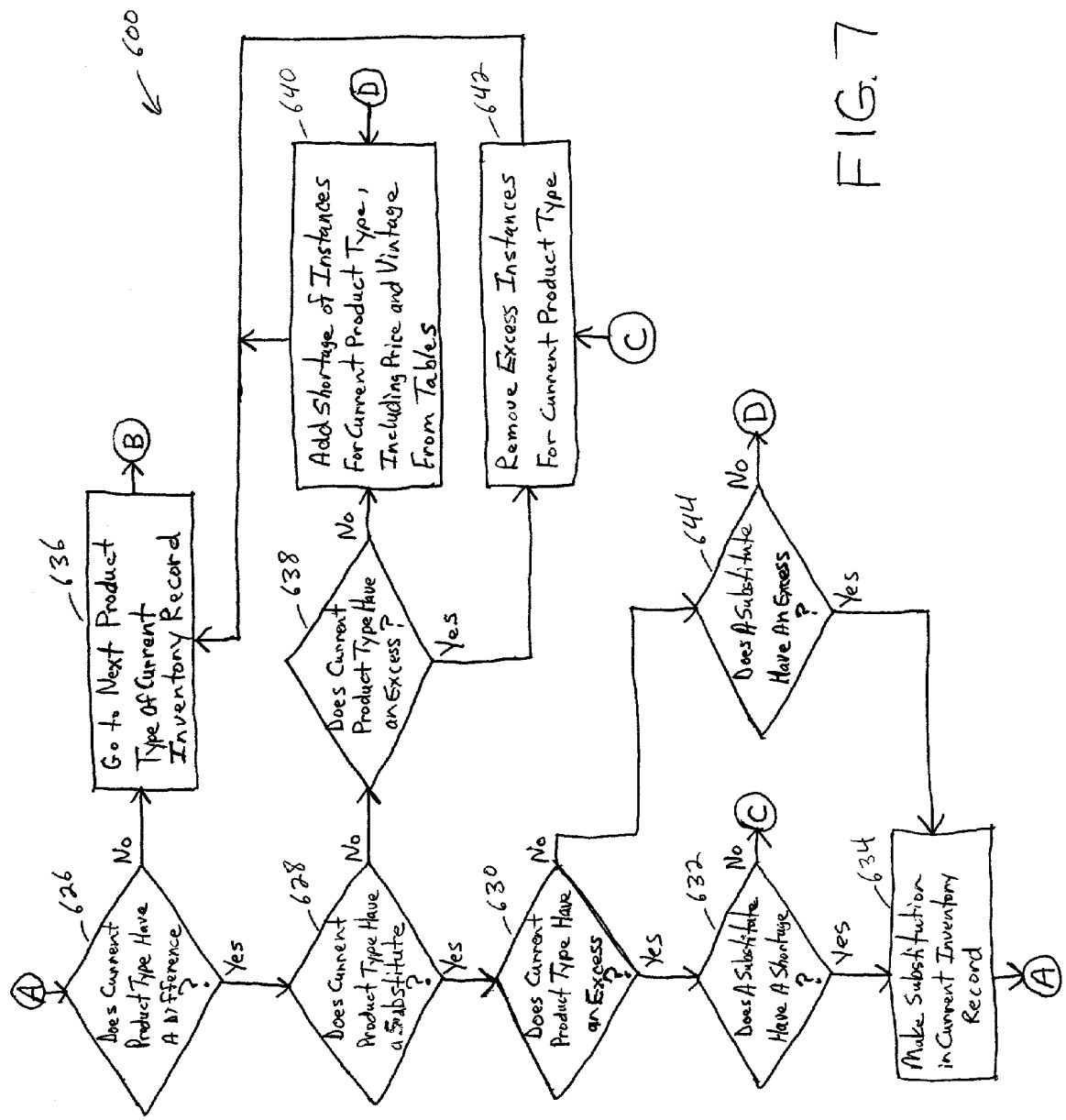

ns. For products in inventory that are not serialized,

INVENTORY RECORD RECONCILIATION

TECHNICAL FIELD

The present invention is related to inventory records that maintain a count of particular items in inventory. More particularly, the present invention is related to reconciling inventory records to provide a more accurate representation of the particular items in inventory.

BACKGROUND

Products maintained by an entity are generally tracked through inventory records. The inventory records maintain a count of each type of product in inventory. The price the product costs when purchased and its vintage, or year of purchase, is also tracked in the inventory record for accounting purposes, such as to schedule depreciation of the products in inventory. Thus, it is important to maintain an accurate inventory record as a part of an entity's bookkeeping practices.

Because the items in inventory are constantly in flux, inventory records must be frequently updated. Items in inventory may be maintained in a warehouse, used in the field, and/or discarded. A periodic recount of the inventory is performed and is compared to the inventory record to reconcile any changes in the inventory with the count of the inventory record. Often, the comparison of the recount to the inventory record results in items being found that are not accounted for by the count of the inventory record. This situation requires a write-on, or an instance of a product being added to the count of the inventory record.

When a write-on occurs, a price and vintage must be assigned to the one or more added instances to the count for the product. For products in inventory that are not serialized, there is no way to determine the actual price and vintage information. To address this situation, the conventional practice has been to arbitrarily assign a price and vintage for write-ons by searching an inventory record for the product to find the earliest vintage and assigning this earliest vintage to the write-ons. Then, a price known for that vintage is assigned as the price for the write-on in the inventory record.

This conventional approach has several flaws that increase the inaccuracy of the inventory record. Because the products in inventory may span several years, it is highly unlikely that all products to be written-on have an actual vintage and price that are close to the earliest vintage and corresponding price. Furthermore, a particular product may have a price that varies during a given vintage year, and assigning the price corresponding to the earliest vintage increases inaccuracy for this additional reason. Also, inventory records are subject to keying errors during data entry, and the price and vintage values may often be incorrectly entered. Therefore, the earliest vintage and/or price that is arbitrarily assigned to a write-on may be a vintage or price that has been entered in error, and additional inaccuracy results.

Therefore, there is a need for an inventory reconciliation system that provides more accurate pricing and vintaging for write-ons.

SUMMARY

Embodiments of the present invention address the problems discussed above and others by reconciling an inventory record through statistically determining the pricing and vintaging for write-ons to the count of the inventory record. Prior to assigning a price and vintage for a particular instance to be added to the count for a product in inventory, a representative price and vintage for the product is statistically determined based on an existing record containing pricing and vintaging for the product. The instances of the count for the existing record that have an outlier value for price and/or vintage are removed prior to the determination of the representative values. Outlier values for price and vintage are those that are outside of the credible range, and the outlier values generally occur due to data entry errors.

After the outlier values have been removed, a statistical process may be employed to find the representative price and vintage. For example, the average value for price and vintage may be computed and used as the representative price and vintage. The representative price and vintage for each product in inventory may be stored in a table and used each time the inventory must be reconciled. A determination is made regarding whether any write-ons or write-offs are necessary for the current inventory record by comparing a recount of the inventory to the count of the inventory record.

When the comparison of the recount with the count in the inventory record indicates that the inventory record has an excess, or a higher count than the actual number of items in inventory, a number of instances of the count equal to the difference may be removed from the inventory record. When the comparison of the recount with the count of the inventory record indicates that the inventory record has a shortage, or a lesser count than the actual number of items in inventory, a number of instances equal to the difference are added to the inventory record. The added instances are then assigned the representative price and vintage that have been previously determined for the product.

The various aspects of the present invention may be more clearly understood and appreciated from a review of the following detailed description of the disclosed embodiments and by reference to the drawings and claims.

DESCRIPTION OF THE DRAWINGS

FIG. 2 is an example of an inventory record having a count, pricing, and vintaging for several product types.

FIG. 3 is an example of a price and vintage table used to assign a representative price and vintage for instances written-on to the inventory record.

FIG. 4 is an example of a substitution table used when reconciling the inventory record.

FIG. 5 is an example of a report summarizing write-ons and write-offs produced as a result of the inventory reconciliation.

FIG. 7 shows a second portion of the exemplary embodiment of FIG. 6.

DETAILED DESCRIPTION

Figure 1:
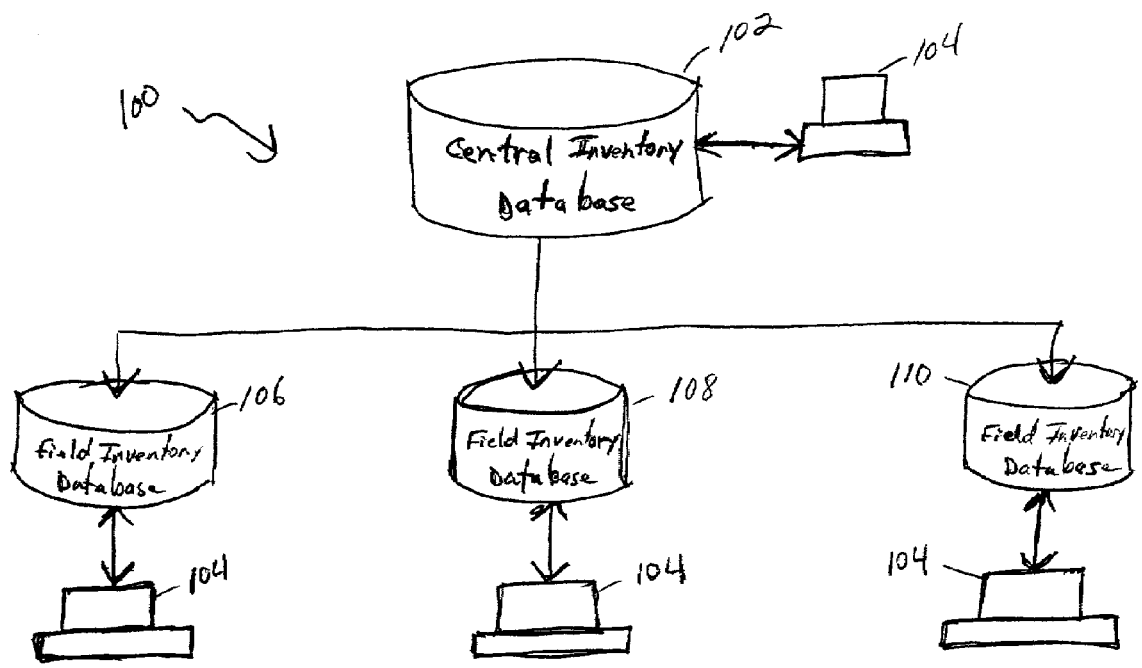
FIG. 1 depicts an example of an inventory system having a central inventory and field inventories.

A distributed inventory environment 100 is shown in FIG. 1. The distributed inventory environment 100 includes a central inventory database 102 and multiple field inventory databases 106, 108, and 110. The databases 102, 106, 108, and 110 are accessible through terminals 104, such as general-purpose computer systems interconnected with the databases through a local area network (LAN) and/or wide area network (WAN). A mainframe computer server that communicates with the terminals 104 generally maintains the databases.

Embodiments of the present invention may be applied to distributed inventory environments as shown in FIG. 1 or in other non-distributed inventory environments, such as where field inventory databases stand alone. A distributed inventory environment 100 may be employed where a central inventory database 102 tracks a central inventory that supplies field inventories tracked by field inventory databases 106, 108, and 110 as needed. The field inventories are located nearby the field locations where the products are placed in service.

Figure 6:
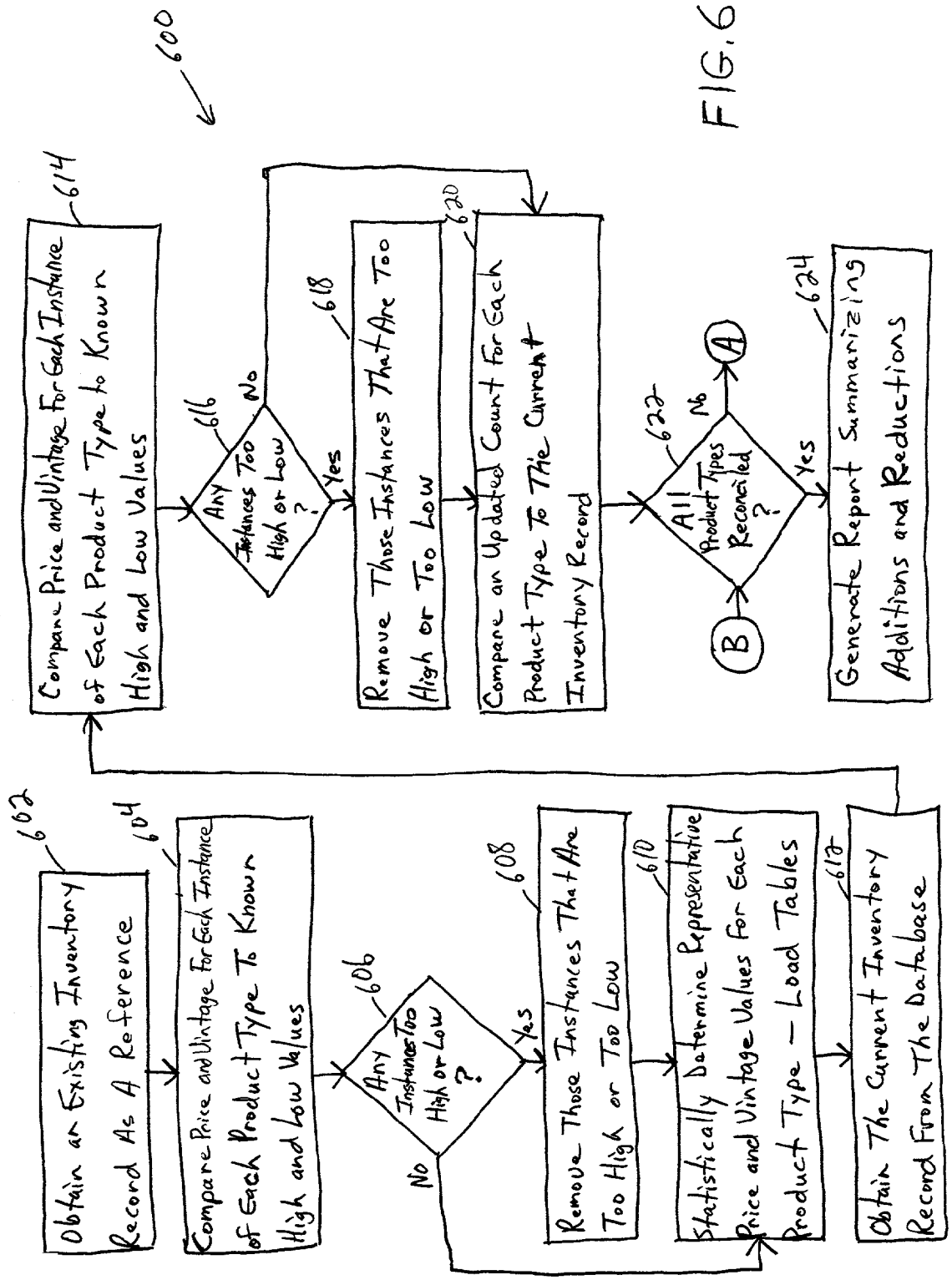
FIG. 6 shows a first portion of an exemplary operational flow of one embodiment of the present invention.

The inventory records of the central inventory database 102 and/or field inventory databases 106, 108, and 110 may be reconciled through application of reconciliation processes, such as those shown in FIGS. 6 and 7, that are implemented in software or hardware by the terminals 104, or by the mainframe server maintaining the databases. The terminals and/or mainframe server implementing the processes of FIGS. 6 and 7 generally have a processing device, such as a general-purpose programmable processor and electronic and/or magnetic storage devices including but not limited to random access memory (RAM), read only memory (ROM), and hard disc drives.

FIG. 2 shows one example of an inventory record 200 maintained by the databases, but the present invention is applicable to inventory records of various formats. The inventory record 200 is divided into different product type sections. Product type A of the inventory is accounted for in a section 202, and Product type B of the inventory is accounted for in a section 204. Similarly, Product type Y is accounted for in a section 206, and Product type Z is accounted for in a section 208.

As shown with respect to Product type A section 202, a count 210 is maintained for the product type along with a price 212 and a vintage 214. The count 210 has many instances 216 spanning from 1 to N, with N equaling the total number of units of Product A in inventory according to the inventory record 200. For each instance 216, a value is stored for price 212 and vintage 214.

As mentioned above, when a recount of the actual inventory is done and is compared to the inventory record 200, there may be more instances in the record than exists in inventory. In that case, the excess instances 216 in the record are deleted, and the instances having the earliest vintage are generally the instances that are removed. However, other instances may be removed instead of those with the earliest vintage. If the comparison of the record with the recount shows that there is a shortage in the record 200 because there are more items in inventory than there are instances 216 of the count 210, then instances are added to the count 210. For each instance, a price 212 and vintage 214 is assigned as is discussed in more detail below with reference to FIGS. 6 and 7.

The price and vintage to be assigned for a particular product is determined statistically from an existing inventory record, such as the inventory record being reconciled, after outlier values have been removed. Otherwise, the outlier values will skew the statistical determination, such as the computation of average value. Examples of instances with price and vintage outliers are shown for the Product Y section 206 and the Product Z section 208. A value is an outlier because it lies beyond a credible range known for the value.

The credible range for price is generally from the least expensive price on record that is known to be valid up to the most expensive price on record that is known to be valid. For example, if an instance of the product has a price on record that is an order of magnitude less than the next least expensive price on record for the product, say $10 versus $100, then it is highly likely that the price for this instance is outside of the credible range. The same principle applies for vintage so that the credible range for vintage is generally from the earliest year on record that is known to be valid up to the latest year on record that is known to be valid. For example, if a product such as an electronic circuit did not exist at the turn of the 20th century, then a vintage of 1900 for the product would be outside of the credible range, as would any vintage beyond the current year.

As shown in FIG. 2, instance 218 of section 206 has a price of $100,000 that is considered an outlier because the credible range of prices for Product Y is from $100 to $200. Similarly, instance 222 of section 208 has a price of $0.75 that is considered an outlier because the credible range of prices for Product Z is from $75 to $110. Instance 220 for Product Y has a vintage of 1920 that is considered an outlier because the credible range of vintages is from 1989 to 2001. Similarly, instance 224 of Product Z has a vintage of 2200 that is considered an outlier because the credible range of vintages is from 1987 to 2001. It is beneficial to remove these instances with outlier values not only from the reference record prior to determining the representative price and vintage for a product but also from the inventory record to be reconciled prior to performing the reconciliation process. This allows the reconciliation process to correct the instances with outliers in the record being reconciled.

FIGS. 3-5 will be discussed with reference to the logical operations of FIGS. 6 and 7. The reconciliation process 600 of FIG. 6 begins at reference operation 602 where an existing inventory record is obtained, such as from the central or field inventory database, to act as a reference for generating representative price and vintage values. The existing inventory record may be the current inventory record being reconciled or an archived inventory record. At compare operation 604, the price and vintage of each instance of the count for each product type in the reference inventory record is compared to known high and low values defining the credible ranges. Query operation 606 then detects whether any instances are too high or too low to find all outlier values. If instances are too high or too low, then remove operation 608 deletes those instances with outliers from the inventory record.

After outlier values have been removed from the reference, table operation 610 statistically determines the representative price and vintage values for each product type. The statistical determination may be an average value, a median value, or other similar computation of a value that falls near the center of the credible range. The price and vintage for each product may then be loaded into tables that are later referenced when adding instances to the current inventory record being reconciled. FIG. 3 shows an example of a price and vintage table 300 which lists the product type 302 as well as the representative price 304 and the representative vintage 306 that have been statistically determined. The storage devices of the terminals and/or mainframe of the inventory system may maintain the price and vintage tables. In the example shown. Product Type A has a representative price of $142 and a representative vintage of 1995.

Database operation 612 then obtains the current inventory record to be reconciled from the appropriate database. Compare operation 614 then compares the price and vintage for each instance of the count for each product type in the inventory record to the known high and low values of the credible ranges. Query operation 616 detects whether any instances have a price or vintage that is too high or too low. If the current inventory record was used as the reference record, then all outliers should have been previously removed and operational flow transitions to compare operation 620. If the current inventory record was not used as the reference record, then query operation 616 may detect some instances having outlier values. If so, then remove operation 618 deletes those instances from the current inventory record. Those instances being removed will be accounted for later through the write-on process and will be assigned a representative price and vintage from the tables that are generally more accurate than the outlier values previously assigned.

Compare operation 620 then compares an updated count for each product type in inventory to the count of each product type in the current inventory record. The updated count is a raw number of the items that actually exist in inventory and is produced by a manual recounting of those items. Query operation 622 then detects whether all product types in inventory have been reconciled. On the first pass and possibly subsequent passes depending upon the number of product types in inventory, query operation 622 will detect that not all product types have been reconciled so operational flow transitions to query operation 626 of FIG. 7.

Query operation 626 detects whether the current product type has a difference between the count of the current inventory record and the updated count. If no difference exists, then the count of the current inventory record for the current product type is correct and product operation 636 shifts focus of the reconciliation process to the next product of the inventory record, if there is one. Operational flow then returns to query operation 622 of FIG. 6 to again detect whether all of the product types have been reconciled. If query operation 626 detects a difference between the updated count for a product type and the count of the current inventory record, then query operation 628 detects whether the current product type has a substitute. A substitution table such as the one shown in FIG. 4 may be referenced to determine whether a substitute for the current product type is available. A substitute is a product that can be interchanged with another in the field and will function properly. The storage device of the terminals and/or mainframe of the inventory system may also maintain the substitution table.

As shown in FIG. 4, a list of product types 402 is provided along with a list of substitutions 404 in the substitution table 400. In the example shown, Product A is interchangeable with Product B and Product D. Similarly, Product B is interchangeable with Product A and Product D. If query operation 628 finds that a substitute is available, then query operation 630 detects from the previous comparison whether the current inventory record has an excess relative to the updated count. If the current inventory record does have an excess for the current product type, then query operation 632 detects whether one or more substitutes for the current product type have a shortage in the current inventory record due to more items existing in inventory than there is a record of.

If one or more substitutes do have a shortage in the current inventory record, then operational flow transitions to substitution operation 634. Substitution operation 634 substitutes a number of the excess instances of the current product type for the substitution product having a shortage until the substitution product has a count equal to the updated count for the substitution product or until the current product type no longer has a difference relative to the updated count. The price and vintage carries over for the instances being substituted, and the instances to substitute may be chosen based on earliest vintage or other selection criteria. Any remaining excess for the current product is applied to any other substitution product that also has a shortage until no other substitutes with shortages are available or until the current product type no longer has a difference between the updated count and the count in the current inventory record. Operational flow then returns to query operation 626.

If query operation 632 detects that no substitute for the current product type has a shortage, then remove operation 642 deletes or writes-off the excess number of instances from the current inventory record for the current product type. As discussed above, instances having the earliest vintage may be deleted, or some other systematic manner of removing instances may be used. At this point, the count of the current inventory record for the current product type is correct and product operation 636 shifts focus of the reconciliation process to the next product of the inventory record, if there is one. Operational flow then returns to query operation 622 of FIG. 6 to again detect whether all of the product types have been reconciled.

If query operation 630 detects that the current product type does not have an excess in the current inventory record, thereby indicating that a shortage exists instead, then flow transitions to query operation 644. Query operation 644 detects whether a substitute for the current product type has an excess in the current inventory record. If one or more substitutes do have an excess in the current inventory record, then operational flow transitions to substitution operation 634. Substitution operation 634 substitutes a number of the excess instances of the substitute product type for the current product type having a shortage until the substitution product has a count equal to the updated count for the substitution product or until the current product type no longer has a difference between the updated count and the count in the current inventory record. As before, the price and vintage carries over for the substituted instances. Any remaining shortage for the current product is reduced by any other substitution product that also has an excess until no other substitutes with excesses are available or until the current product type no longer has a difference between the updated count and the count in the current inventory record. Operational flow then returns to query operation 626.

If query operation 644 detects that no substitute for the current product type has an excess, then add operation 640 adds or writes-on the shortage of instances for the current inventory record for the current product type. As discussed above, each instance added to the current inventory for a particular product is assigned a representative price and vintage such as by referencing the price and vintage table 300 of FIG. 3. At this point, the count of the current inventory record for the current product type is correct and product operation 636 shifts focus of the reconciliation process to the next product of the inventory record, if there is one. Operational flow then returns to query operation 622 of FIG. 6 to again detect whether all of the product types have been reconciled.

If query operation 628 detects that the current product type does not have a substitute, then operational flow transitions to query operation 638. Query operation 638 detects whether the current inventory record for the current product type has an excess. If so, then operational flow transitions directly to remove operation 642 where the excess number of instances are written-off as discussed above. If the current inventory record for the current product type does not have an excess but has a shortage instead, then operational flow transitions directly to add operation 640 where the excess number of instances are written-on as previously discussed.

If query operation 622 of FIG. 6 detects that all product types of the current inventory record have been reconciled, then operational flow transitions to report operation 624. Report operation 624 generates a report that summarizes the additions and reductions to the current inventory record. An example report 500 is shown in FIG. 5 and contains a product type listing 502, and the corresponding listing of reductions 504 and additions 506. As shown in the example, the reconciliation process has resulted in two reductions or write-offs to the current inventory record for Product type A and three additions or write-ons to the current inventory record for Product type B. The report 500 may include additional information as well such as the total amount written-on, the total amount written-off, and the net change in total price for the current inventory record due to the write-ons and write-offs.

The price and vintage tables such as the table shown in FIG. 3 may be created once, and then reused for multiple inventory reconciliation events. The tables may be updated or recreated whenever a change in the price and/or vintage occurs for the new items being added to the inventory. Furthermore, additional tasks may be conducted during the reconciliation process, such as reconciling the investment record for the items in inventory in addition to reconciling the inventory record. Reconciling the investment record involves keeping track of payment or non-payment relative to the physical movement of an item into or out of inventory due to buying or selling of that particular item.

Although the present invention has been described in connection with various exemplary embodiments, those of ordinary skill in the art will understand that many modifications can be made thereto within the scope of the claims that follow. Accordingly, it is not intended that the scope of the invention in any way be limited by the above description, but instead be determined entirely by reference to the claims that follow.

What is claimed is:

1. A system for reconciling a current inventory record having counts, pricing, and vintaging for a plurality of product types, comprising:
   a storage device comprising:
      a first database containing the current inventory record comprising count, vintage, and price information,
      a second database containing tables defining allowable product substitutions for the plurality of product types, and
      a representative price and vintaging table containing price and vintage records, the price and vintage table containing a representative price and a representative vintage for each of the plurality of product types, wherein the representative price and the representative vintage are statistically predetermined based on historical inventory records having outlier values for price and vintage removed; and
   a processing device configured to;
      receive an updated count for each product type of an inventory,
      obtain the current inventory record from the first database,
      remove from each count of the current inventory record, each instance of each count having outlier values for pricing or vintage,
      compare the updated count to the count of the current inventory record to obtain a difference in count for each product type,
      determine if the difference for a first product type indicates a shortage in the count of the current inventory record for the first product type relative to the updated count for the first product type,
      reference the product type of the shorted count of the current inventory record with the second database,
      determine if the first product type is interchangeable with a second product type, if the difference for the first product type indicates a shortage in the count of the current inventory record for the first product type,
      determine if the difference for the second product type indicates an excess in the count of the current inventory record for the second product type relative to the updated count for the second product type, if the first product type is interchangeable with a second product type,
      substitute the excess of the second product type in place of the shortage of the first product type in the current inventory record, if the difference for the second product type indicates an excess in the count of the current inventory record for the second product type, wherein the price and vintage information being substituted in place of the shortage of the first product type in the current inventory record is a representative price and a representative vintage from the representative price and vintage table; and
      generate a report showing reductions and additions to the count of the current inventory record.

2. The system of claim 1, wherein the representative price and vintage are averages of the price and vintage from the historical inventory record.

3. The system of claim 1, further comprising:
   the processing device further configured to add the difference to the count of the current inventory record for the first product type along with the representative price and vintage for each instance added to the count if the difference for the first product type indicates a shortage in the count of the current inventory record for the first product type relative to the updated count for the first product type and if the first product type is not interchangeable with the second product type.

4. The system of claim 1, wherein the processing device is further configured to determine if the difference for a first product type indicates an excess in the count of the current inventory record for the first product type relative to the updated count for the first product type, if the difference for the first product type does not indicate a shortage in the count of the current inventory record for the first product type.

5. The system of claim 1, wherein the processing device is further configured to determine if the first product type is interchangeable with the second product type, if the difference for the first product type indicates an excess in the count of the current inventory record for the first product type.

6. The system of claim 1, wherein the processing device is further configured to determine if the difference for the second product type indicates a shortage in the count of the current inventory record for the second product type relative to the updated count for the second product type, if the first product type is interchangeable with a second product type.

7. The system of claim 1, wherein the processing device is further configured to substitute the excess of the first product type in place of the shortage of the second product type in the current inventory record, if the difference for the second product type indicates a shortage in the count of the current inventory record for the second product type, wherein the pricing and vintaging associated with the excess of the first product type are also substituted in place of the shortage of the second product type.

8. A system for reconciling a current inventory record having counts, pricing, and vintaging for a plurality of product types, comprising:
   a storage device comprising:
      a first database containing the current inventory record comprising count, vintage, and price information;
      a second database containing tables defining allowable product substitutions for the plurality of product types; and
      a representative pricing and vintaging table containing price and vintage records, the price and vintage table containing a representative price and a representative vintage for each of the plurality of product types, wherein the representative price and the representative vintage are statistically predetermined based on historical inventory records having outlier values for price and vintage removed; and
   a processing device configured to;
      receive an undated count for each product type of an inventory,
      obtain the current inventory record from the first database,
      remove from each count of the current inventory record, each instance of each count having outlier values for pricing or vintage,
      compare the updated count to the count of the current inventory record to obtain a difference in count for each product type,
      determine if the difference for a first product type indicates a shortage in the count of the current inventory record for the first product type relative to the undated count for the first product type,
      reference the product type of the shorted count of the current inventory record with the second database,
      determine if the first product type is interchangeable with a second product type, if the difference for the first product type indicates a shortage in the count of the current inventory record for the first product type,
      determine if the difference for the second product type indicates an excess in the count of the current inventory record for the second product type relative to the updated count for the second product type, if the first product type is interchangeable with a second product type,
      substitute the excess of the second product type in place of the shortage of the first product type in the current inventory record, if the difference for the second product type indicates an excess in the count of the current inventory record for the second product type, wherein the price and vintage information being substituted in place of the shortage of the first product type in the current inventory record is a representative price and a representative vintage from the representative price and vintage table; and
      generate a report showing reductions and additions to the count of the current inventory record wherein the processing device is further configured to reduce the count of the current inventory record for the first product type by the difference if the difference for the first product type indicates an excess in the count of the current inventory record for the first product type relative to the updated count for the first product and the first product is not interchangeable with the second product type, wherein the processing device is further configured to reduce the count of the current inventory record for the first product type by deleting a number of instances of the count for the first product type that are equal to the difference and that have an earliest vintage.

* * * * *